United States Patent [19]
Bozec et al.

[11] 3,787,301
[45] Jan. 22, 1974

[54] ELECTROLYTIC METHOD FOR PRODUCING HIGH-PURITY NICKEL FROM NICKEL OXIDE ORES

[75] Inventors: Christian H. Bozec; Bernard G. Dulong, both of Le Havre; Robert Y. Lemarinel, Sainte-Adresse, all of France

[73] Assignee: "Le Nickel," Vervile Propriete, Paris, France

[22] Filed: Mar. 28, 1972

[21] Appl. No.: 238,774

[30] Foreign Application Priority Data
Mar. 29, 1971 France.................................. 71.10924

[52] U.S. Cl.............. 204/112, 75/101 BE, 423/139, 423/147
[51] Int. Cl......................... C22d 1/14, C22b 23/06
[58] Field of Search. 204/112; 75/101 BE; 423/139, 423/147

[56] References Cited
UNITED STATES PATENTS
3,466,144 9/1969 Kay..................................... 423/147
3,334,034 8/1967 Geldzahler et al.................. 204/112

FOREIGN PATENTS OR APPLICATIONS
1,123,986 8/1968 Great Britain................... 75/101 BE Primary Examiner—John H. Mack
Assistant Examiner—R. L. Andrews
Attorney, Agent, or Firm—Fleit, Gipple & Jacobson

[57] ABSTRACT

A method for recovering nickel from nickel containing ores comprises:
lixiviating the ore in sulphuric acid and neutralizing the resulting solution until it reaches a pH between 3.5 and 4;
adding to said solution a precipitation agent to obtain a nickel hydroxide precipitate;
dissolving said precipitate in a slight excess of sulphuric acid, and removing the dissolution residue;
purifying the solution resulting from the preceding step by liquid-liquid extraction with an organic phase containing a sulphonium salt, and eluting said organic phase to recovering cobalt; and
subjecting said solution to an electrolysis to recover high-purity nickel.

7 Claims, 1 Drawing Figure

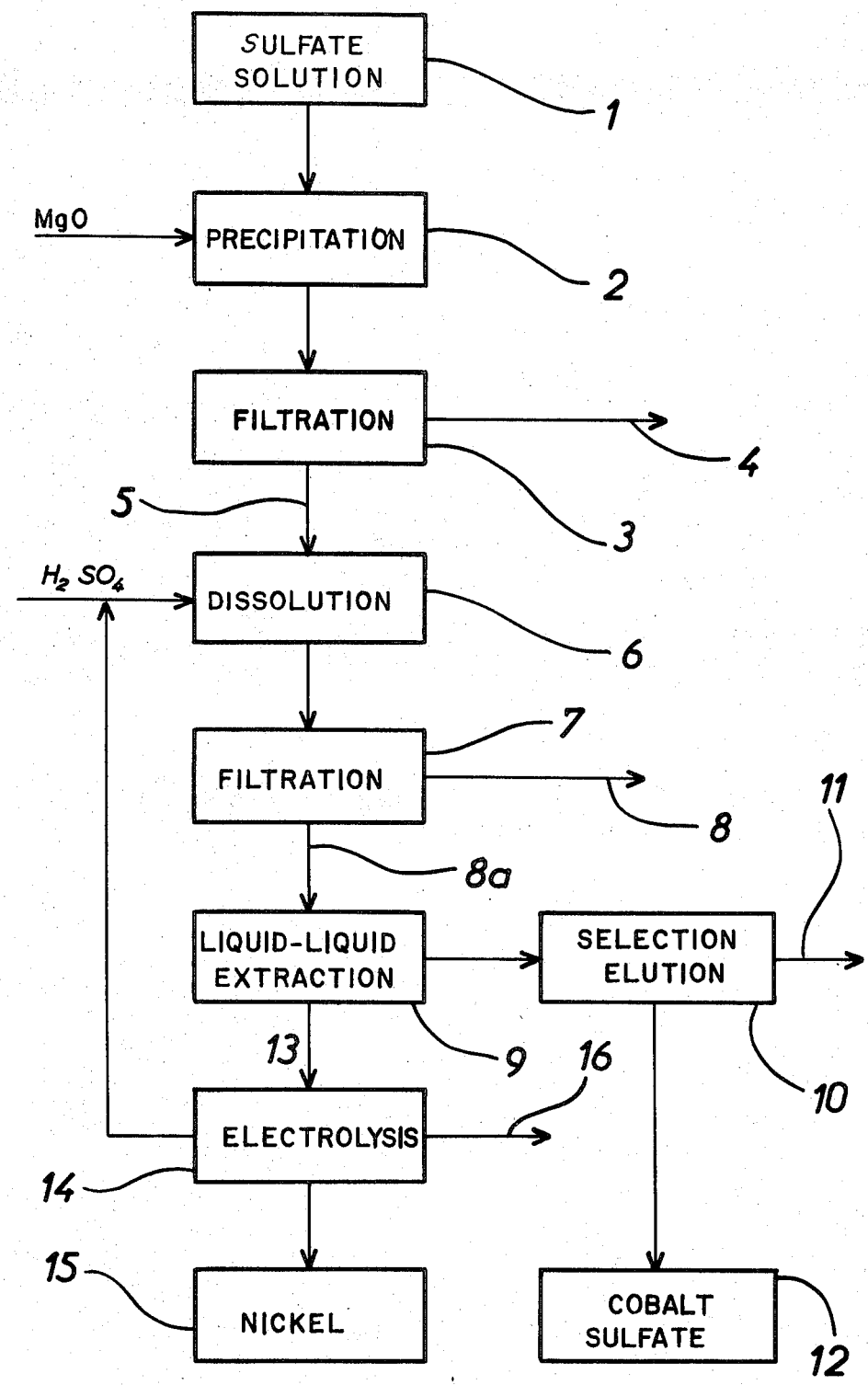

ELECTROLYTIC METHOD FOR PRODUCING HIGH-PURITY NICKEL FROM NICKEL OXIDE ORES

The present invention relates to a hydrometallurgical method of treating nickel oxide ores in order to recover nickel, as well as other commercially valuable metals, such as cobalt, which are generally present in such ores.

Various methods are known for treating such nickel ores, but these known methods generally represent only one step in the long sequence of operations which leads to high-purity metal, i.e., a product containing more than 99.95 percent of nickel. Each of these steps presents a great number of possible treatments, which leads to a nearly infinite number of possible methods of production, so that it is improbable that even those skilled in the art can determine which method is industrially the most advantageous.

Therefore, one of the objects of the present invention is to provide a complete method for producing high-purity nickel from nickel oxide ores, which involves lower cost and lower capital investment than do known methods.

Another object of the invention is to place an optimum technological solution at the disposal of those skilled in the art.

A further object of the invention is to provide such a method which easily be employed on an industrial scale.

Yet a further object of the invention is to provide for the recovery of cobalt contained in the initial product.

In accordance with the present invention the method comprises the following steps:
  lixiviating the ore in sulphuric acid and neutralizing the resulting solution till it reaches a pH between about 3.5 and 4;
  adding to said solution a precipitation agent to obtain a nickel hydroxide precipitate;
  dissolving said precipitate in a slight excess of sulphuric acid, and removing the dissolution residue;
  purifying the solution resulting from the preceding step by liquid-liquid extraction with an organic phase containing a sulphonium salt, and eluting said organic phase to recovering cobalt; and,
  subjecting said solution to an electrolysis to recover high-purity nickel.

Preferably, said nickel hydroxide precipitate is removed by filtration.

Preferably also, said precipitation agent is magnesium oxide, calcium oxide, or sodium carbonate.

Advantageously, said sulphonium salt is a sluphonium thiocyanate, and its elution is carried out substantially as described in our Belgian Pat. No. 769,526.

In order to lower the operating expense, it is useful to use the anolyte from the electrolysis step for selectively dissolving fresh amount of the precipitate resulting from the addition of said precipitation agent.

For the same reason, the solution resulting from said precipitation step is preferably treated in any suitable known manner to recover the precipitation agent and the sulphuric acid it contains.

When thus broadly stated, the process may appear simple, but the process is essentially a combination of steps, several of which are themselves novel, and in each step a considerable degree of care must be exercised.

An embodiment of the present invention will now be described, by way of example, with reference to the accompanying drawing which is a diagrammatical flowsheet representing the various steps of the method according to the invention.

When submitting one metric ton of laterite to a sulphuric lixiviation in this example, a sulphate solution is obtained which contains the following amounts of metallic elements:
  - Ni : 12.0 kg
  - Co : 1.3 kg
  - Fe : 0.04 kg
  - Al : 0.22 kg
  - Cu : 0.075 kg
  - Zn : 0.46 kg
  - Mn : 5.47 kg
  - Mg : 4.98 kg.

This solution, shown as 1 on the drawing, is neutralized to a pH of about 3.5 to 4 and magnesia is added in such an amount that the solution contains 13.85 kg of pure MgO. This statement 2 is followed by filtration 3 which produces, on the one hand, a solution 4 of magnesium sulphate at a pH of about 7 to 8 and containing 0.58 kg of manganese and 64.60 kg of magnesium sulphate, i.e., 13.05 kg of magnesium. This means that 4.7 kg of magnesium have been extracted from the initial solution 1, taking into account the fact that 8.35 kg magnesium have been introduced at 2 in the form of 13.85 kg MgO.

It is, of course, possible to treat this solution 4, in a suitable known manner, in order to recover magnesia and sulphuric acid which are respectively used for the precipitation treatment 2 and for the lixivation of fresh amounts of nickel oxide ores. This recycling is not shown on the drawing.

On the other hand, the filtration step 3 produces a precipitate 5 which is dissolved again at 6 by means of 33.0 kg of sulphuric acid, this amount being calculated with respect to pure $H_2SO_4$. Of the 33.0 kg, 5.5 kg are introduced as fresh sulphuric acid from outside, and the remainder, 27.5 kg, comes from a recycling step which will be further described below.

A further filtration 7 eliminates the residue 8 which is left by the preceding step 6 and which contains, for one metric ton of initial ore, 0.547 kg manganese, 0.037 kg magnesium, and 0.159 kg aluminium.

The resulting solution 8a, the pH of which is about 3, is purified at 9 by liquid-liquid extraction employing an organic phase containing sulphonium thiocyanate, as described in the afore-mentioned Belgian Patent. After a selective elution 10 of this organic phase, also described in the Belgian Patent, the total amount of zinc and copper contained in the initial solution 1, i.e., 0.46 kg zinc and 0.075 kg copper, are recovered at 11 together with the amount of iron which had not been eliminated by the filtration 7, i.e., 0.001 kg, and also together with 0.05 kg cobalt.

Furthermore, 0.38 kg nickel and 1.25 kg cobalt are recovered at 12 in the form of sulphates, which corresponds to an extraction yield of 96.2 percent for cobalt.

The purified solution 13 is submitted to electrolysis 14 with insoluble anodes operating at a current density of about 625 Amperes per square meter and at 6 Volts, which produces nickel 15 with a purity of 99.96 percent. 11.46 kg of nickel are obtained, which corresponds to an extraction yield near 95.5 percent. Adding to this amount the nickel obtained at 12, the total extraction yield amounts about 98 percent.

The anolyte used during the electrolysis step 14 contains mainly sulphuric acid and nickel sulphate, and it is recycled to the step 6 of selective dissolution, as mentioned above.

The electrolysis 14 produces also slurries 16 which contain, inter alia, 4.343 kg manganese.

Those skilled in the art could readily adjust the numerical values given above for a modified process where, for example, the precipitation step 2 is carried out by means of sodium carbonate $Na_2CO_3$ or slaked line $Ca(OH)_2$.

What we claim is:

1. A method for producing high-purity nickel from nickel oxide ore, comprising lixiviating the ore in sulphuric acid and neutralizing the resulting solution till it reaches a pH between 3.5 and 4; adding to said solution a precipitation agent to obtain a nickel hydroxide precipitate; separating said precipitate from the liquor, taking it up subsequently with a slight excess of sulphuric acid, and removing the dissolution residue; purifying the solution resulting from this removal by liquid-liquid extraction employing an organic phase containing a sulphonium salt, and eluting said organic phase; and, subjecting said solution to electrolysis to recover high-purity nickel.

2. A method as claimed in claim 1, wherein said nickel hydroxide precipitate is separated from the liquor by filtration.

3. A method as claimed in claim 1, wherein said precipitation agent is magnesium oxide, calcium oxide, or sodium carbonate.

4. A method as claimed in claim 1, wherein said sulphonium salt is a sulphonium thiocyanate.

5. A method as claimed in claim 1, wherein said electrolysis is carried out so as to produce a catholyte and an anolyte.

6. A method as claimed in claim 5, wherein said anolyte is used for taking up fresh amounts of said nickel hydroxide precipitate.

7. A method as claimed in claim 1, wherein the liquor remaining after the separation of said nickel hydroxide precipitate is treated for the recovery of the precipitating agent and the sulfuric acid which it contains.

* * * * *